Dec. 13, 1960  K. L. HUGET  2,963,734
QUICK-RELEASABLE PIVOTAL CONNECTOR
Filed Feb. 12, 1958
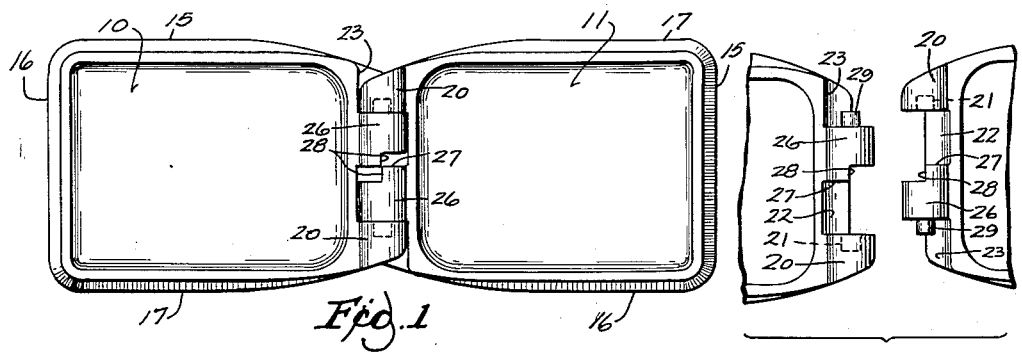
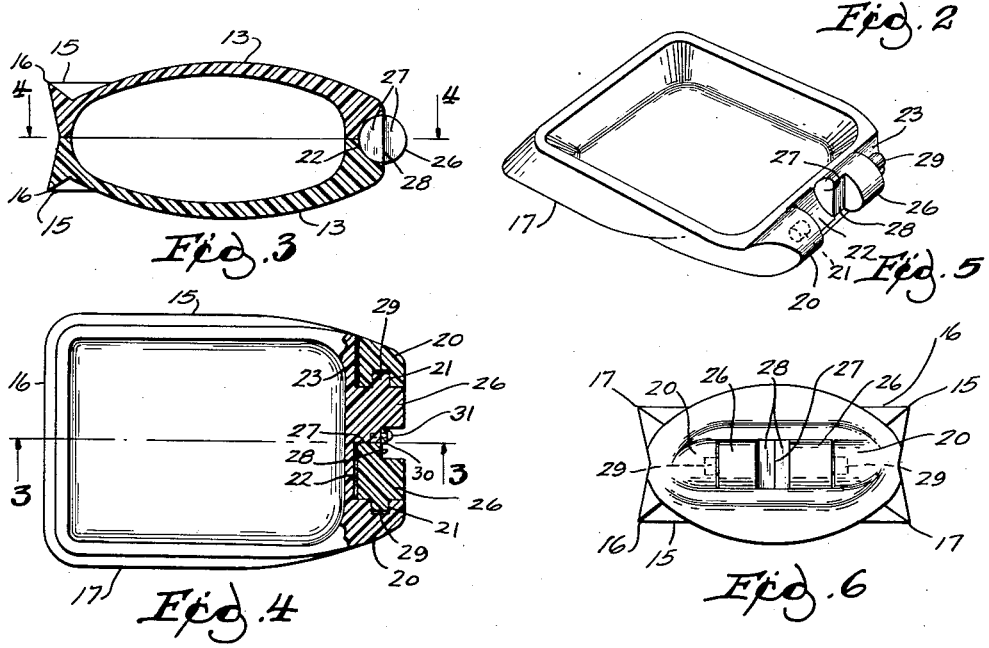
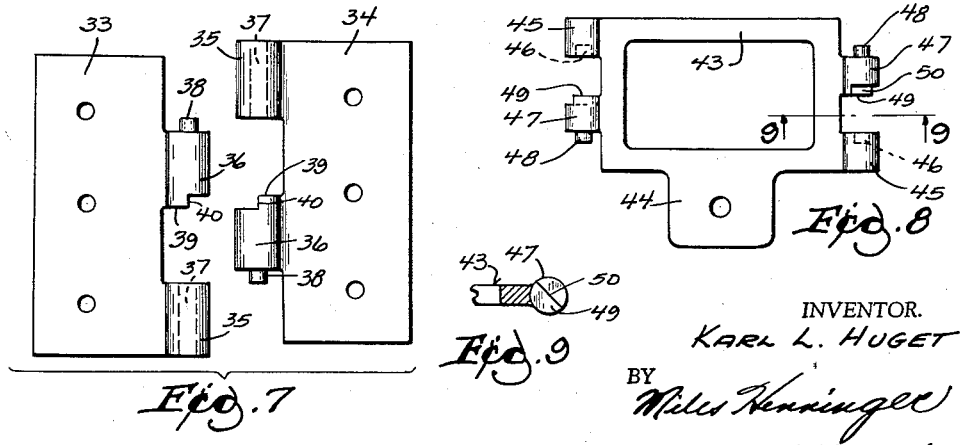
INVENTOR.
KARL L. HUGET
BY
ATTORNEY

United States Patent Office 2,963,734
Patented Dec. 13, 1960

2,963,734

QUICK-RELEASABLE PIVOTAL CONNECTOR

Karl L. Huget, 240 Elmgrove Road, Milwaukee, Wis.

Filed Feb. 12, 1958, Ser. No. 714,805

7 Claims. (Cl. 16—171)

This invention relates to improvements in quick-releasable pivotal connectors which remain in connected condition during ordinary use of the object to which the connector is applied, even when no detent is used.

In making cast or molded boxes, door hinges, conveyor chains and the like, means must be provided to form a pivotal connector between the box halves, the hinge leaves or the chain links. It is desirable to make all parts identical and thereby avoid the need for more than one die or mold and avoid the need for storing of male and female or right-hand and left-hand parts. Further, it is desirable to avoid separate parts such as hinge pintles, chain pins and the like, which must be separately furnished and handled and which frequently require tools for insertion into or removal from other connector parts. Also, it is desirable to make pivotal connectors easily and quickly releasable but to retain the pivotal engagement unless the connector is subjected to an action not occurring in the usual use of the object.

It is therefore an object of the present invention to provide a pivotal connector for units such as cast or molded boxes made of plastics and in which the two box halves are identical and any two halves may be assembled to make a complete box.

Another object of the invention is to provide identical connector parts integral with the units for forming pivotal connections of the units usable under ordinary conditions without an additional part or parts such as a pintle in the usual door hinge.

A further object of the invention is to provide identical units such as links of sprocket chains with easily and quickly detachable pivotal connectors which will remain in pivotal engagement unless subject to a voluntary relative movement of the links other than the movement to which the chain is subjected in use.

Although the present connector has been illustrated as applied to objects where the pivotal connection is, respectively, not subjected to forces in any particular direction, is required to resist pressures axially of the connector in one direction and is required to resist tension on the structure as a whole, it will be obvious that the connector can be applied to any object which is not subjected during use to particular relative movements between the parts. Thus, the present connector is released when the parts are brought into substantially co-planar position, then subjected to movement in a direction axially of the connector and then subjected to tension in a direction at right angles to the pivoting axis of the connector.

In the drawings:

Figure 1 is a plan view of an opened box molded from a plastic material and using my form of pivotal connector;

Figure 2 is a view similar to Figure 1 of fragments of a box bottom and top with the pivotal connector disengaged and the box halves drawn apart;

Figure 3 is a cross-section through the box on the plane 3—3 of Figure 4 and showing the pivotal connector in section transversely of the pivot axis;

Figure 4 is a cross-section through the box on the plane 4—4 of Figure 3 and showing the pivotal connector in section along the axis thereof and with a detent applied to one connector portion;

Figure 5 is a perspective view of one of two identical parts to be used in forming the box;

Figure 6 is an end elevation of the box of the preceding figures from the hinge or pivotal connector end;

Figure 7 is an elevation of a door hinge showing the two leaves of the hinge separated and provided with my connector;

Figure 8 is a plan view of a length of a conveyor chain showing complementary pivotal connector parts at the ends; and Figure 9 is an enlarged fragment on the plane 9—9 of Figure 8 to one desirable angle of a shoulder face on one projection.

Referring specifically to the drawings, numerals 10 and 11 designate two identical parts which may form the bottom and top of a box molded from a plastic material. The present box is designed to be held in the hand and therefore has rounded exterior surfaces 13 with relatively sharp edged flanges 15, 16 and 17 along and extending from one entire edge and partially from two other edges of each box half. Identical pivotal connector structures are formed on the fourth edge of each box half and comprise a substantially cylindrical first projection 20 with a socket 21 axially therein or therethrough, the projection extending from one corner of the box for approximately one-fourth of the length of that box edge and the socket extending inwardly from the inner end of the projection.

From the inner end of first projection 20 approximately one-fourth of the length of the hinge edge is cut away to provide an arcuate recessed surface 22 for receiving another portion of the hinge. A similar but shorter arcuate surface 23 is provided from the other corner of the box and is of a size to receive a hinge projection identical with the projection 20, 21. An approximately cylindrical second projection 26 occupies that portion of the box edge between the arcuate surfaces 22, 23 and is formed with an undercut shoulder 27 to form a face 28 on one end and has a cylindrical pin 29 projecting axially from the other end. The cylindrical pin 29 has the same diameter as the socket 21 and is of a height slightly less than the width of the shoulder face 28, the height being taken in the direction of the axis of the pin. The face 28 of shoulder 27 is at approximately the diameter of the pin 28 and at right angles to the plane defined by the meeting edges of the box halves 10, 11. The angle of shoulder face 28 to the major plane of the box part is determined by the most convenient angle for joining the two box parts and shoulder angle of as little as 45° have been found satisfactory.

When the two box halves are to be joined for pivoting action, the two separated hinge structures are brought together endwise and in slightly offset relation as shown in Figure 2 whereby the two shoulder faces 28 are brought into superposed position but not into contact. The ends of pins 29 then pass the inner ends of the first projections 20 and severally come into alignment with the sockets 21. One box part is then moved sideways relative to the other by a distance equal to the width of the shoulder faces 28 so that each of pins 29 is entered into a socket 21 and the box halves are now pivotally engaged. The shoulder faces 28 are now no longer in superposed relation so that the box halves are free to pivot to closed position as shown in Figure 3 with the shoulder edges passing each other. Disconnection of the pivotal connector, of course, requires movements opposite to those above described.

So long as the box halves are to pivot about their socket and pin connections, and until one box half is moved laterally relative to the other box half sufficient to bring the shoulder faces 28 again into superposed position, the pins 29 cannot be disengaged from the sockets 21. However, such relative movement of the two box halves is possible only when the box parts are in a plane at which the face surfaces 28 of the shoulders can be brought into superposed position, as the shoulder edges will abut in all other positions and prevent lateral movement of the connector parts. It is desirable that the clearances between the adjacent ends of projections 20 and 26 be kept the usual close manufacturing tolerances of non-known precision parts.

If it is desired to provide a detent for preventing any disengagement of first projection sockets 21 and second projection pins 29 unless the detent is voluntarily released, such detent takes the form of a plate 30 (see Figure 4) of a size to seat on one shoulder face 28 with one plate edge co-extensive with the end surface of the shoulder. The detent should not be longer than the length of the shoulder face 28 and is held in place by a fastening pin 31 having a drive fit into a hole in the shoulder, or by other simple fastener means. The detent plate 30 need raise one shoulder face 28 only by slightly more than the clearance of pins 29 in sockets 21 so that the shoulder faces can no longer be brought into superposed position whereupon the ends of the shoulders abut whenever any attempt is made to move one connector portion laterally relative to the other.

Figure 7 illustrates a door hinge or similar article made of sheet metal or metal plates and has a pivotal connector-structure closely similar to that described above but in which the two leaves 33, 34 of the hinge are identical. As such hinges are usually made from metal in sheet or plate form, the pivoting portions of the hinges are easily made by bending the plate to form first cylindrical barrel 35 and second barrel 36 with an axial hole 37 all the way through the barrel 35 and a pin 38 set into the barrel 37 and projecting from one end thereof. The provision of shoulders 39 on the barrels 36 is merely a matter of notching the plates for the hinge leaves while they are flat so that each finished barrel presents two faces 40 in substantially one plane. The present hinge leaves are again brought into pivoting relation by bringing the two leaves together in co-planar and slightly offset relation until the faces 40 of the shoulders 38 are superposed and then axially moving the one leaf relative to the other so that the pins 38 may engage in their sockets 37. A detent such as above described, may also be placed on the shoulder faces 40 so that such faces of the second barrels cannot be superposed.

Figures 8 and 9 illustrate one link of a well known type of conveyor chain to which the present invention is applied. Such links comprise a body 43 on which is formed a laterally extending flange 44 and identical pivot connector structures are formed on the ends of the body for connection with other links. The lateral projection 44 is provided for mounting thereon of a bucket or scraper as is usual and the link can be used for either a right-hand or left-hand mounting of a bucket. The connector parts are identical at the two ends but in reversed positions as heretofore shown. A substantially cylindrical first projection 45 occupies aproximately one-fourth of a link end and is provided with a cylindrical socket 46. Another substantially cylindrical second projection 47 of approximately the same overall dimensions as the projection 45, is formed on the link and in spaced relation to the projection 45 such that a complementary second projection may pass between projections 45, 47. The second projection 47 has a cylindrical pin 48 formed on or seated into one end of the projection 47. A shoulder 49 is formed on the other end of projection 47 with a face 50 in the plane through a diameter of the socket 46 and the pin 48 and preferably at forty-five degrees to the longitudinal central plane through the link. Assuming that the chain moves from left to right as seen in the drawing, it will be understood that the link can be turned one hundred eighty degrees so that the flange 44 will be on the other side of the chain when a bucket is to be attached thereto on such other side.

Although the actions for coupling the connector portions have been described as involving placing of the two units to be coupled, in substantially the same plane before moving one of them endwise and then laterally relative to the other and the shoulder surfaces have been described as perpendicular to such plane, change in position of the shoulder surfaces relative to other portions of the unit may be desirable in some instances and then changes the angle to which two parts are turned to superpose the shoulder faces. Thus, the conveyor chain may be of such length that it sags between the sprockets or the intermediate support rollers about which and over which the chain moves. If the shoulder faces are related as above described, it is possible for the chain links to be accidentally subjected to lateral thrust in the proper direction for disengaging a connector. Such accidental disconnection is prevented if the shoulder faces are at the angle described so that the shoulder faces will not pass each other unless the links assume an angle of forty-five degrees to one another which is beyond that assumed when the chain sags. It will be understood that the more exact the alignment and size of the pins and sockets and the placing of the shoulder faces in one given plane, the greater the necessity to bring the two units into exactly one and only one position relative to each other for connection and disconnection.

It will be seen that connector portions are provided on each of two parts or on both ends of a part in the case of a chain, and are identical and that each shoulder portion includes a first projection and a second projection from a part body. The first projection has a socket into one end co-axial with the projection and the ends of such projection are planar. The second projection has a pin extending from one end co-axial with and of a length substantially equal to the depth of the first projection socket. The connector portions are assembled so that an end of each of the two second projections are adjacent and such adjacent ends each provide a shoulder face of substantially one-half the height of a projection and at substantially the same angle to the longitudinal axis of the parts. Hence, two connector portions may be assembled by superposing the shoulder faces and then axially moving one part axially relative to another to enter the pins into the sockets. For some uses, accidental reverse movement of connector portions is unlikely or immaterial so that no detent need be used. However when accidental disengagement of a connector must be prevented, the detent plate in effect raises the level of one shoulder face and makes such reverse disengaging movement impossible.

It will be obvious that a hinge of any desired length can be made merely by repeating the two projection structure as often as desired along the length of the hinge leaves. It will also be obvious that units may be provided with connector portions on each of the four edges so that a mat-like structure results which may be used as a temporary pavement or the like.

I claim:

1. In a quick-releasable connector for the hinge-like joining of a plurality of parts each having a body portion and mating connector portions thereon, the connector portions each comprising a first projection with a socket therein, a second projection with a pin extending therefrom for entering the socket of a first projection, the second projections of mating parts having shoulders formed on adjacent ends thereof, the two projections on one part being spaced slightly more than the length of the second projections and the shoulders thereon, the shoulders having faces for movement into superposed relation upon entry of the second projection of one part between the two projections of another part and for entry of the pins of the second projections severally into the sockets of mating first projections upon lateral movement of one connector relative to the other, the adjacent ends of the second projection shoulders being in abutting relation at all positions except the superposed relation of the shoulder faces, and a detent removably attached to the face of one shoulder for preventing accidental reverse lateral movement disengaging the pins from the sockets.

2. In a quick-releasable connector for the hinge-like joining of a plurality of parts each having a body portion and mating connector portions thereon, the connector portions each comprising a first projection with a socket therein, a second projection with a pin extending therefrom for entering the socket of a first projection, the second projections of mating parts having shoulders formed on adjacent ends thereof, the two projections on one part being spaced slightly more than the length of the second projections and the shoulders, the shoulders having faces for movement into superposed relation upon entry of the second projection of one part between the two projections of another part and for entry of the pins of the second projections severally into the sockets of mating first projections upon lateral movement of one connector relative to the other, the adjacent ends of the second projection shoulders being in abutting relation at all positions except the superposed relation of the shoulder faces, and a detent plate of no greater extent than the face of a shoulder and removably attached thereto for preventing accidental reverse lateral movement disengaging the pins from the sockets.

3. In a quick-releasable connector for the hinge-like joining of a plurality of parts each having a body portion and mating connector portions thereon, the connector portions each comprising a first projection with a socket therein, a second projection with a pin extending therefrom for entering the socket of a first projection, the second projections of mating parts having shoulders formed on adjacent ends thereof, the two projections on one part being spaced slightly more than the length of the second projections and the shoulders thereon, the shoulders having faces for movement into superposed relation upon entry of the second projection of one part between the two projections of another part and for entry of the pins of the second projections severally into the sockets of mating first projections upon lateral movement of one connector relative to the other, and a detent plate of no greater extent than the face of a shoulder and removably attached thereto with one edge co-extensive with the edge of the projection, the adjacent ends of the second projection shoulders and the edge of the plate being in abutting relation at all positions for preventing accidental reverse lateral movement disengaging the pins from the sockets.

4. In a quick releasable connector for the hinge-like joining of a plurality of parts each having a body portion with mating connector portions thereon, the connector portions each comprising a first projection with a transverse inner end having a socket extending axially from said end into said first projection, and a second projection with a pin extending axially from the end thereof away from said first projection for entering the socket of a first projection on the other connector part, each second projection having a shoulder on the end thereof away from said pin, each shoulder having a transverse end at right angles to the axis of said socket and a longitudinally extending face joining said end of said shoulder and the adjacent end of said second projection, the length of said second projection including the pin and excluding the shoulder thereon being slightly less than the distance between said inner end of said first projection and said transverse end of said shoulder sufficient to provide clearances between the outer ends of said pin and shoulder on one part and adjacent ends of both projections on the other part when said parts are arranged with the longitudinally extending faces of said shoulders in superposed relation providing for entry of the second projection of each part between the two projections of the other part and for entry of the pin of each part respectively into the socket of the first projection of the other part, the adjacent ends of said second projection shoulders being in abutting relation for all relative positions of said parts except the superposed positions of said shoulder faces.

5. In a quick releasable connector for the hinge-like joining of a plurality of parts each having a body portion with mating connector portions thereon, the connector portions each comprising a first projection with a socket therein, and a second projection with a pin extending axially from the end thereof away from said first projection and axially aligned with the socket in said first projection for entering the socket on the other connector part, each second projection having a shoulder of substantially one-half the height of said projections from said body and formed on the end thereof away from said pin, each shoulder having a transversely extending end and a longitudinally extending face joining the transversely extending end of said shoulder and the adjacent end of said second projection, each pin being of a length less than the axial length of a shoulder longitudinally extending face, the length of said second projection including the pin and excluding the shoulder thereon being slightly less than the distance between said inner end of said first projection and said transverse end of said shoulder sufficient to provide clearances between the outer ends of said pin and shoulder on one part and adjacent ends of both projections on the other part when said parts are arranged with the longitudinally extending faces of said shoulders in superposed relation providing for entry of the second projection of each part between the two projections of the other part to a position with the pins and sockets of said two parts in axial alignment and for entry of the pin of each part respectively into the socket of the first projection of the other part, the adjacent ends of said second projection shoulders being in abutting relation for all relative positions of said parts except the superposed positions of said shoulder faces.

6. In a quick releasable connector for the hinge-like joining of a plurality of parts each having a body portion with mating connector portions thereon, the connector portions each comprising a first projection with a socket therein, and a second projection with a pin extending axially from the end thereof away from said first projection and axially aligned with the socket in said first projection for entering the socket on the other connector part, each second projection having a shoulder of substantially one-half the height of said projections from said body and formed on the end thereof away from said pin, each shoulder having a transverse end at right angles to the axis of said socket and a longitudinally extending face joining said end of said shoulder and the adjacent end of said second projection, the length of said second projection including the pin and excluding the shoulder thereon being slightly less than the distance between said inner end of said first projection and said transverse end of said shoulder sufficient to provide clearances between the outer ends of said pin and shoulder on one part and adjacent ends of both projections on the other part when said parts are arranged with the longitudinally extending faces of said shoulders in superposed relation providing for entry of the second projection of each part between the two projections of the other part and for entry of the pin of each part respectively into the socket of the first projection of the other part, the adjacent ends of said second projection shoulders being in abutting relation for all relative positions of said parts except the superposed position of said shoulder faces.

7. In a quick releasable connector for the hinge-like joining of a plurality of parts each having a body portion with mating connector portions thereon, the connector portions each comprising a first projection with a socket therein along the axis thereof, and a second projection with a pin extending therefrom for entering the socket of a first projection on the other connector part, the second projections of mating portions having shoulders formed on adjacent ends thereof, each shoulder having a transverse outer end at right angles to the axis of said socket and a longitudinally extending face on a plane substantially through the axis of said projections, the two projections on each part being axially spaced a distance between adjacent ends thereof slightly greater than the axial length of a second projection measured from the outer end of the pin thereon to the transverse outer end of the shoulder thereof sufficient to provide clearances between the outer ends of said pin and shoulder on one part and adjacent ends of both projections on the other part when said parts are arranged with the longitudinally extending faces of said shoulders in superposed relation providing for entry of the second projection of each part between the two projections of the other part and for entry of the pin of each part respectively into the socket of the first projection of the other part, the adjacent ends of said second projection shoulders being in abutting relation for all relative positions of said parts except the superposed positions of said shoulder faces.

References Cited in the file of this patent

UNITED STATES PATENTS

| | | |
|---|---|---|
| 32,482 | Lane | June 4, 1861 |
| 2,526,458 | Bronnenkant | Oct. 17, 1950 |
| 2,765,488 | Ruff | Oct. 9, 1956 |